United States Patent
Schwarzkopf (10) Patent No.: US 10,211,772 B2
(45) Date of Patent: Feb. 19, 2019

(54) METHOD FOR OPERATING AN ELECTRICAL MACHINE AND ELECTRICAL MACHINE

(71) Applicant: Brose Fahrzeugteile GmbH & Co. Kommanditgesellschaft, Wuerzburg, Wuerzburg (DE)

(72) Inventor: Johannes Schwarzkopf, Marktheidenfeld (DE)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 0 days.

(21) Appl. No.: 15/677,404

(22) Filed: Aug. 15, 2017

(65) Prior Publication Data

US 2018/0048256 A1 Feb. 15, 2018

(30) Foreign Application Priority Data

Aug. 15, 2016 (DE) .................. 10 2016 215 175

(51) Int. Cl.
*H02P 6/24* (2006.01)
*H02J 3/01* (2006.01)
(Continued)

(52) U.S. Cl.
CPC .............. *H02P 29/50* (2016.02); *H02M 1/12* (2013.01); *H02P 27/08* (2013.01)

(58) Field of Classification Search
CPC .... H02P 6/24; H02P 25/22; H02P 6/28; H02J 3/01
See application file for complete search history.

(56) References Cited

U.S. PATENT DOCUMENTS

| 5,850,130 A * | 12/1998 | Fujisaki | .................... C22C 1/02 |
|---|---|---|---|
| | | | 318/400.2 |
| 2005/0073280 A1* | 4/2005 | Yoshinaga | ................ H02J 3/01 |
| | | | 318/727 |

(Continued)

FOREIGN PATENT DOCUMENTS

DE 10 2014 000 945 A1 7/2015

OTHER PUBLICATIONS

D.G. Holmes, "The Significance of Zero Space Vector Placement for Carrier-Based PWM Schemes", Transactions of Industry Applications, 1996, pp. 1122-1129, vol. 32, Issue 5.
(Continued)

*Primary Examiner* — Eduardo Colon Santana
*Assistant Examiner* — Cortez Cook
(74) *Attorney, Agent, or Firm* — Muncy, Geissler, Olds & Lowe, P.C.

(57) ABSTRACT

A method for operating an electric machine with a power source, an electric motor, and an intermediary power converter, in which an input current of the power source is converted to a multi-phase output current for the electric motor by a pulse width modulated control of a number of semiconductor switches of the converter, wherein the or each pulse is generated at a first point in time and terminated after a pulse duration at a second point in time, in which for each alternating current component, which is generated in the course of the pulse-width-modulated driving of the semiconductor switches in an intermediate circuit of the power source, a frequency spectrum is determined, and in which the pulse durations of the pulses of the pulse width modulated control can be set such that the sum of the frequency spectra of the alternating current components is minimal.

6 Claims, 4 Drawing Sheets

(51) Int. Cl.
*H02P 25/22* (2006.01)
*H02P 6/28* (2016.01)
*H02P 29/50* (2016.01)
*H02P 27/08* (2006.01)
*H02M 1/12* (2006.01)

(56) References Cited

U.S. PATENT DOCUMENTS

| | | | | |
|---|---|---|---|---|
| 2013/0207581 A1* | 8/2013 | Aoki | ............ | H02P 6/24 318/400.21 |
| 2015/0214869 A1* | 7/2015 | Schwarzkopf | ............ | H02P 6/28 318/400.2 |
| 2016/0072416 A1* | 3/2016 | Hirotani | ............ | H02P 25/22 318/400.02 |

OTHER PUBLICATIONS

Donald Grahame Holmes, "The Significance of Zero Space Vector Placement for Carrier-Based PWM Schemes", IEEE Transactions on Industry Applications, vol. 5, No. 5, Piscataway, NJ., Oct. 1, 1996.

Jelena Loncarski, "Analysis of the Crrent 1-8 Ripple in Three-Phase Two-Level VSIs", Springer London, London, Jan. 1, 2014.

\* cited by examiner

METHOD FOR OPERATING AN ELECTRICAL MACHINE AND ELECTRICAL MACHINE

This nonprovisional application claims priority under 35 U.S.C. § 119(a) to German Patent Application No. 10 2016 215 175.4, which was filed in Germany on Aug. 15, 2016, and which is herein incorporated by reference.

BACKGROUND OF THE INVENTION

Field of the Invention

The invention relates to a method for operating an electrical machine with a power source and with an electric motor as well as with an intermediary power converter, in which an input current of the power source is converted by means of a pulse width modulated control of a number of semiconductor switches of the power converter into a multiphase output current for the electric motor, wherein the or each pulse is generated at a first point in time and terminated after a pulse duration at a second point in time. The invention further relates to an electric machine operated by such a method, in particular for a motor vehicle.

Description of the Background Art

Adjustment systems driven by an electric motor used as motor vehicle components, such as, for example, window regulators, seat adjusters, door and sliding roof drives or radiator fan drives, as well as pumps and interior fans, typically have an electric machine with a controlled electric motor. For example, brushless electric motors are known in which a rotor rotatably mounted relative to a stator is driven by a magnetic rotating field. For this purpose, phase windings of the stator are subjected to a corresponding electrical three-phase or motor current, which is controlled and regulated by means of a controller as part of a (motor) electronics.

Such electrical machines generally comprise a (high-voltage) battery as an internal energy storage device from which the electric motor is supplied with electrical energy in the form of a direct current. For converting the direct current into the motor current, a converter (inverter, power inverter) is suitably connected between the energy store and the electric motor. A (direct voltage) intermediate circuit is connected downstream of the energy store, to which a bridge circuit of the power converter is connected. The energy store and the intermediate circuit act as a power source for providing the input-side direct current (input current) for the converter. The motor current is generated by a pulse width modulated (PWM) control of semiconductor switches of the bridge circuit as a multiphase output current. By the pulses of the PWM control, the semiconductor switches are switched over in clocked fashion between a conducting state and a blocking state.

By means of the switching processes of the semiconductor switches, alternating currents are generated in the lines of the intermediate circuit or of the power source. These alternating currents must undergo a critical assessment in respect of compliance with EMC directives (electromagnetic compatibility).

SUMMARY OF THE INVENTION

It is therefore an object of the invention to provide a method for operating an electrical machine. In particular, the EMC behavior of the electrical machine is to be improved during operation. The invention is also based on the object of specifying an electrical machine operating in accordance with such a method.

The method according to the invention is suitable and arranged for operating an electrical machine. The electrical machine in this case has an energy store with a downstream (direct current) intermediate circuit, which together are designed as a power source (voltage supply) for an electric motor of the machine. A converter, for example in the form of an inverter (power inverter), is connected between the power source and the electric motor.

During operation of the machine, the converter converts an input current of the power source into a multiphase, in particular three-phase, output current (motor current, three-phase current) for the electric motor. For this purpose, a number of semiconductor switches of the converter connected in the intermediate circuit are controlled in clocked fashion with a pulse width modulated (PWM) control. The PWM control has at least one pulse-shaped signal (pulse) per phase for switching the respective semiconductor switches. The or each pulse is generated at a first point in time and terminated after a respective pulse duration at a second point in time.

According to the method, a frequency spectrum is determined for each alternating current component which is generated in the intermediate circuit of the power source during the pulse-width-modulated control of the semiconductor switches. For this purpose, the alternating current components are, for example, converted into the frequency domain by means of Fourier transform. The pulse durations of the pulses of the pulse width modulated control are hereby set such that the sum of the frequency spectra of the alternating current components (sum spectrum) becomes minimal. As a result, the alternating current formed by the alternating current components in the power source is reduced or minimized, which advantageously translates to the EMC behavior of the electrical machine. In particular, this reduces the load on the power or voltage source. Furthermore, it is possible thereby to improve the acoustics of the machine, i.e., a noise reduction is made possible.

The frequency spectra of the alternating current components (current block) generally have comparable amplitudes, which differ, however, in the phase position from one another. By adjusting the pulse durations, the phase positions of the frequency spectra are shifted with respect to one another without the amplitude of the frequency spectra being changed. By a suitable selection of the pulse durations, it is therefore possible, at least for certain frequencies, to minimize the sum spectrum and thus the alternating current in the power source.

The sum spectrum can typically not be minimized over the complete frequency range, but it is sufficient for a frequency that needs to be optimized, in particular for the clock frequency of the PWM control, that the minimization be performed. The amplitude is minimal when the phase positions of the individual frequency spectra of the alternating current components are displaced oppositely or counter to one another. In a suitable further development, the individual frequency spectra, in particular in the region around the frequency to be optimized, are phase-shifted by 180° with respect to each other to minimize the sum.

In an embodiment, the pulse durations are adjusted for a specific frequency, in particular the frequency of a maximum of the or each frequency spectrum. The maximum of the or each frequency spectrum is essentially determined by the clock frequency (fundamental wave component) of the PWM control or of the pulses. Preferably, the determination of the relevant frequency is performed dynamically during operation of the electrical machine. In other words, the setting of the pulse durations for the relevant frequency during runtime is performed in real time.

In an embodiment, the determination is made with the clock frequency. This means that each period of the PWM control is individually optimized. In this case, it is, for example, conceivable to calculate the optimal pulse durations only once per millisecond. This reduces the processing load. However, a circuit-engineering embodiment with an application of a bandpass for the relevant frequency is also conceivable, wherein the pulse durations are set during an adjustment time in such a way that a minimum is established.

In an embodiment, the or each pulse is generated by a first time period earlier than the first point in time and/or terminated by a second time period later than the second point in time. By adapting the first and second time periods, the temporal positions of the first and second points in time are effectively shifted during the PWM control. Consequently, the pulse duration is thus varied or set. As a result, a (relative) phase shift of the frequency spectra of the alternating current components relative to one another is implemented in a simple manner.

In an embodiment, each pulse for generating the multi-phase output current is provided with the same first and second duration for setting the pulse duration. In other words, a common first duration is used for all activations, that is, for switching the semiconductor switches from the non-conducting (blocking) to the conducting state, so that all pulses are generated at an earlier (first) point in time. Likewise, a common second time period is used for all deactivations, which means switching the semiconductor switches from the conducting to the blocking state, so that all pulses are terminated at a later (second) point in time. It is likewise conceivable, for example, that all pulses are generated at a later point in time and/or terminated at an earlier point in time.

The amount of time for which the pulse durations of the PWM control are set can be varied for different periods. This means that, for example, new values for the duration of the PWM control are determined, or that the same values are used for the duration over several periods. It is essential that all pulse durations of the different phases are changed during a period of the same durations. In other words, the difference between the mutual pulse durations before and after the adjustment of the pulse durations is constant within a period.

In an embodiment, the first and the second duration are equal in magnitude. In particular, the generated phase currents of the output current are thereby only slightly influenced so that no significant influencing of the motor operation occurs.

An additional or further aspect of the method according to the invention provides that the first and second durations are calculated in advance for various specific frequencies and are stored in a table. As a result, a particularly low-cost method is implemented, which at the same time can be flexibly adapted to different frequencies, for example as a result of a change in the clock frequency of the PWM control.

The electric machine is particularly suitable and configured for the electromotive drive in a motor vehicle, for example for an adjustment system used as a motor vehicle component. The electric motor is preferably designed brushless with a stator and with a rotor rotatably mounted therein. The stator has a number of phase windings which, on the one hand, are connected to the converter and, on the other hand, are interconnected, for example, by a common connection point (star point) in a star connection. The converter has a controller, which means a control unit. In this case, the controller is generally suitable and configured for the implementation of the method described above, in a programmatic and/or circuit-engineering manner. The controller is thus specifically configured to detect the alternating current components in the power source during operation and to adjust the pulse durations of the (PWM) pulses by controlling and/or regulating the PWM control in such a way that the pulses are displaced against each other in their relative (frequency) phase position, so that the alternating current in the power source is minimal.

In an embodiment, the controller is formed, at least in the core, by a microcontroller with a processor and a data memory, in which the functionality for carrying out the inventive method is programmatically implemented in the form of an operating software (firmware), so that the method—possibly interacting with the user—is executed automatically when the operating software is executed in the microcontroller.

In the context of the invention, the controller can alternatively also be formed by a non-programmable electronic component, for example an ASIC (application-specific integrated circuit), in which the functionality for implementing the method is implemented using a circuit.

The electrical machine operated with the method thus has improved behavior with regard to EMC radiation as well as with regard to the noise development occurring as a result of the switching processes of the semiconductor switches. The method according to the invention is particularly suitable and adapted for use in speed-controlled systems. In principle, the application is not restricted to the automobile sector.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
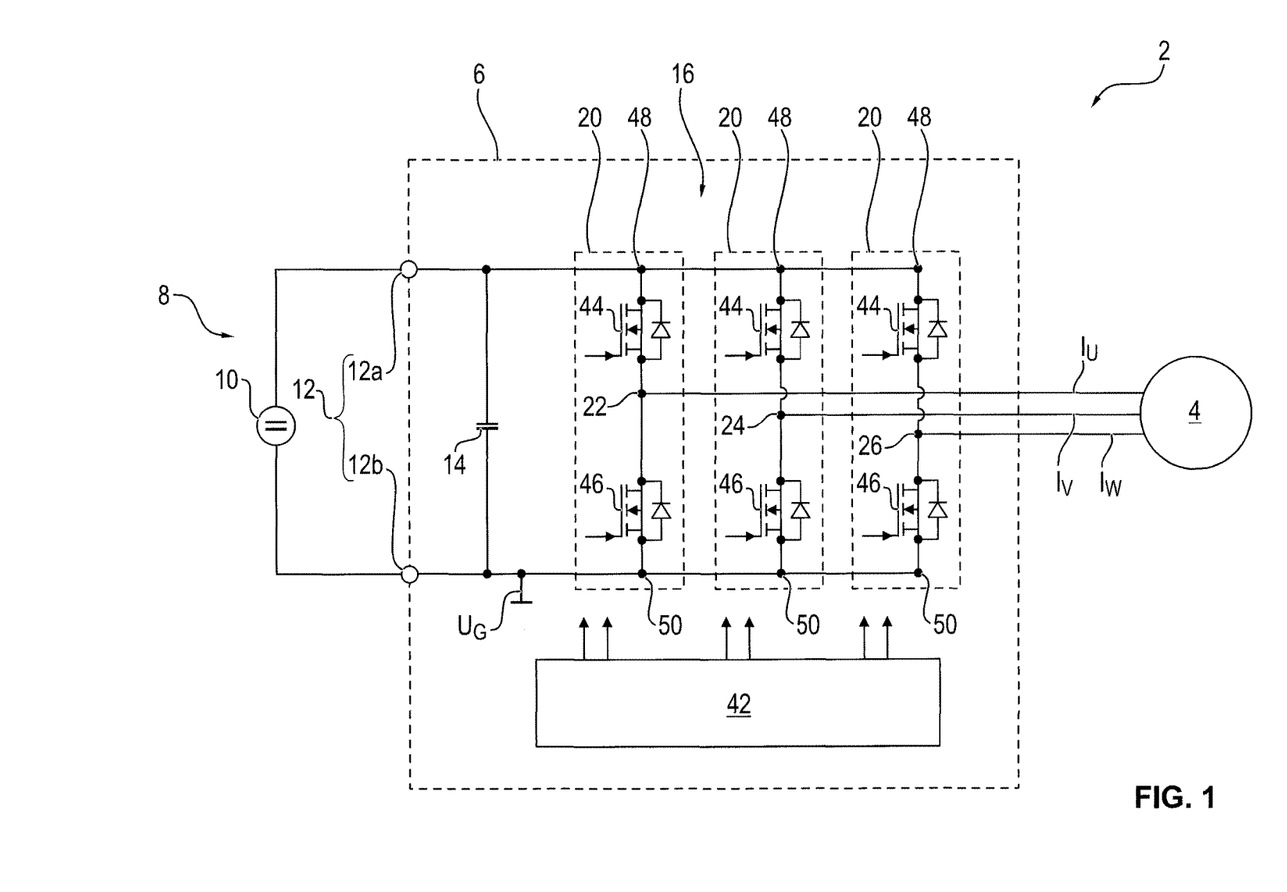
FIG. 1 illustrates an electrical machine with a power source and with an electric motor as well as an power converter connected therebetween.

FIG. 1 shows an electrical machine 2 for an electromotive adjustment system of a motor vehicle (not shown), for example a window lifter or a seat adjuster. For this purpose, the machine 2 comprises a three-phase electric motor 4, which is connected by means of a power converter 6 to a power source (voltage supply) 8. In this exemplary embodiment, the power source 8 comprises an energy storage device 10 inside the vehicle, for example in the form of a (motor vehicle) battery, as well as a (DC) intermediate circuit 12 which is connected to it and which at least partially extends into the converter 6.

The intermediate circuit 12 is essentially formed by a feed line 12a and a return line 12b, by means of which the converter 6 is connected to the energy store 10. The lines 12a and 12b are at least partially guided into the converter 6, in which a DC link capacitor 14 and a bridge circuit 16 are connected between the lines.

During operation of the engine 2, an input current $I_E$ supplied to the bridge circuit 16 is converted into a three-phase output current (motor current, phase current) $I_U, I_V, I_W$ for the three phases U, V, W of the electric motor 4. The output currents $I_U, I_V, I_W$, hereafter also known as phase currents, are guided to the respective phases (windings) U, V, W (FIG. 2) of a stator, not shown.

Figure 2:
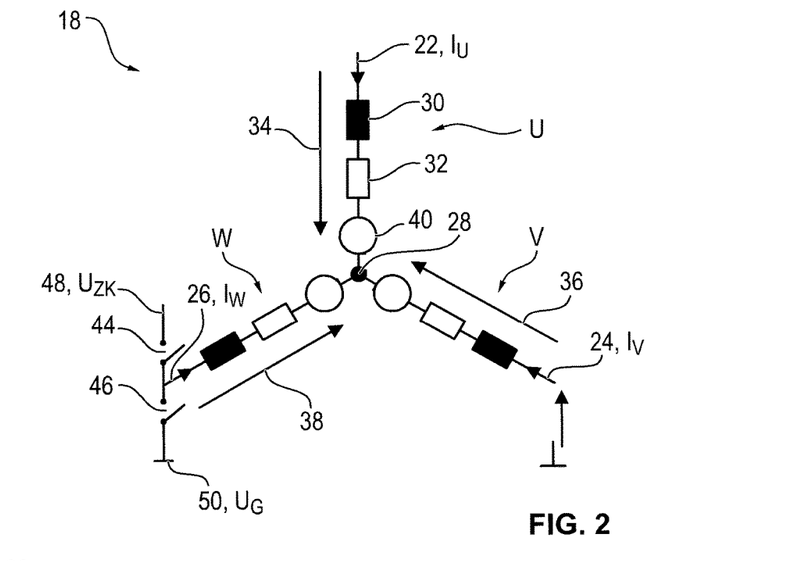
FIG. 2 illustrates three phase windings of a three-phase electric motor of the machine in star connection.

A star circuit 18 of the three phase windings U, V, W is shown in FIG. 2. The phase windings U, V and W are each connected with a respective (phase) end 22, 24, 26 to a respective bridge module 20 (FIG. 3) of the bridge circuit 16 and interconnected with the respective opposite end in a star point 28 as a common connection terminal. In the illustration in FIG. 2, the phase windings U, V and W are each shown by means of an equivalent circuit diagram in the form of an inductor 30 and an ohmic resistance 32 as well as a respective voltage drop 34, 36, 38. The voltage 34, 36, 38, which drops across the phase winding U, V, W, is schematically represented by arrows, and is the sum of the voltage drops across the inductor 30 and the ohmic resistance 32 as well as the induced voltage 40. The voltage 40 induced by a movement of the rotor of the electric motor 4 (electromagnetic force, EMF) is shown in FIG. 2 by means of a circle.

The star circuit 18 is triggered by means of the bridge circuit 16. The bridge circuit 16 with the bridge modules 20 is designed, in particular, as a B6 circuit. In this embodiment, during operation, a high (DC) voltage level of the feed line 12a and a low voltage level of the return line 12b are switched over at a high switching frequency in clocked fashion to each of the phase windings U, V, W. The high voltage level is in this case in particular an intermediate circuit voltage $U_{ZK}$ of the intermediate circuit 12, wherein the low voltage level is preferably a ground potential $U_G$. This clocked control is implemented as a PWM control, represented in FIG. 1 by means of arrows, by a controller 42, with which control and/or regulation of the speed, the power and the direction of rotation of the electric motor 4 is possible.

The bridge modules 20 each comprise two semiconductor switches 44 and 46, which are shown schematically and exemplarily for the phase W in FIG. 2. The bridge module 20 is connected on the one hand with a potential terminal 48 to the feed line 12a and hence to the intermediate circuit voltage $U_{ZK}$. On the other hand, the bridge module 20 is contacted with a second potential terminal 50 to the return line 12b and thus to the ground potential $U_G$. Via the semiconductor switches 44, 46, the respective phase end 22, 24, 26 of phase U, V, W can be connected either to the intermediate circuit voltage $U_{ZK}$ or to the ground potential $U_G$. When the semiconductor switch 44 is closed (conducting) and the semiconductor switch 46 (non-conductive) open, the phase end 22, 24, 26 is connected to the potential of the intermediate circuit voltage $U_{ZK}$. Accordingly, the phase U, V, W contacts the ground potential $U_G$ upon opening the semiconductor switch 44 and closing the semiconductor switch 46. As a result, it is possible by means of the PWM control to apply two different voltage levels to each phase winding U, V, W.

Figure 3:
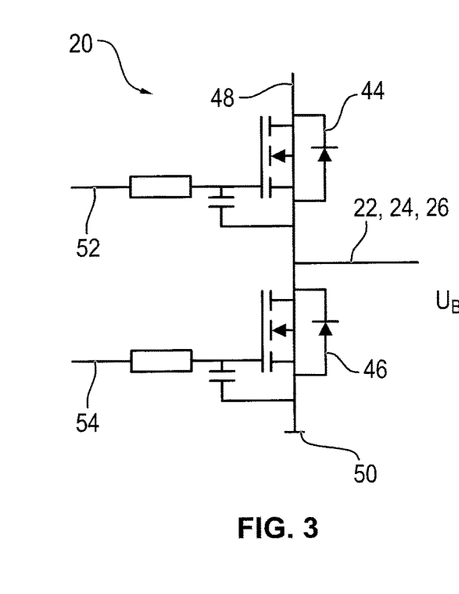
FIG. 3 illustrates a bridge module of a bridge circuit of the converter for controlling a phase winding of the electric motor.

In FIG. 3, a single bridge module 20 is shown in simplified form. In this exemplary embodiment, the semiconductor switches 44 and 46 are implemented as MOSFETs (metal-oxide semiconductor field-effect transistors), each of which are switched over in clocked fashion by means of the PWM control between a switched-on state and a blocking state. For this purpose, the respective gate connections are routed to corresponding control voltage inputs 52, 54, by means of which the signals of the PWM control of the controller 42 are transmitted.

Figure 4:
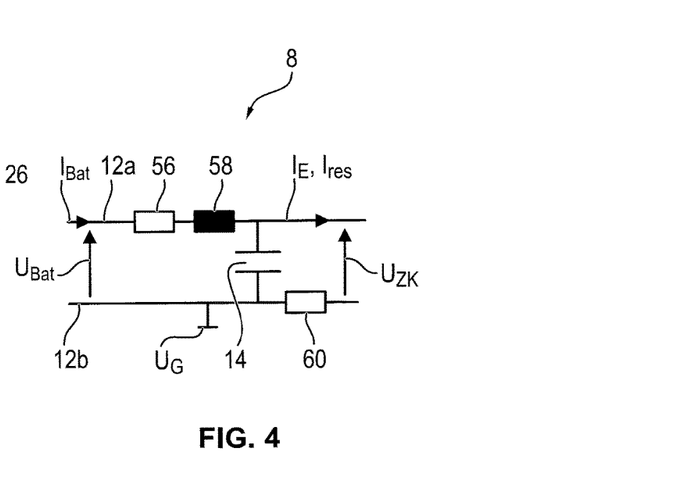
FIG. 4 illustrates an equivalent circuit diagram of the power source.

FIG. 4 shows an equivalent circuit diagram for the power source 8. During operation, the energy storage 10 generates a battery voltage $U_{Bat}$ and a corresponding battery current $I_{bat}$ for the operation of the power converter 6. In FIG. 4, the internal resistance of the energy storage 10 is shown as an ohmic resistor 56, and a self-inductance of the energy storage device 10 as an inductor 58. A shunt resistor 60 is connected in the return line 12b, at which the intermediate circuit voltage $U_{ZK}$ drops.

Figure 5:
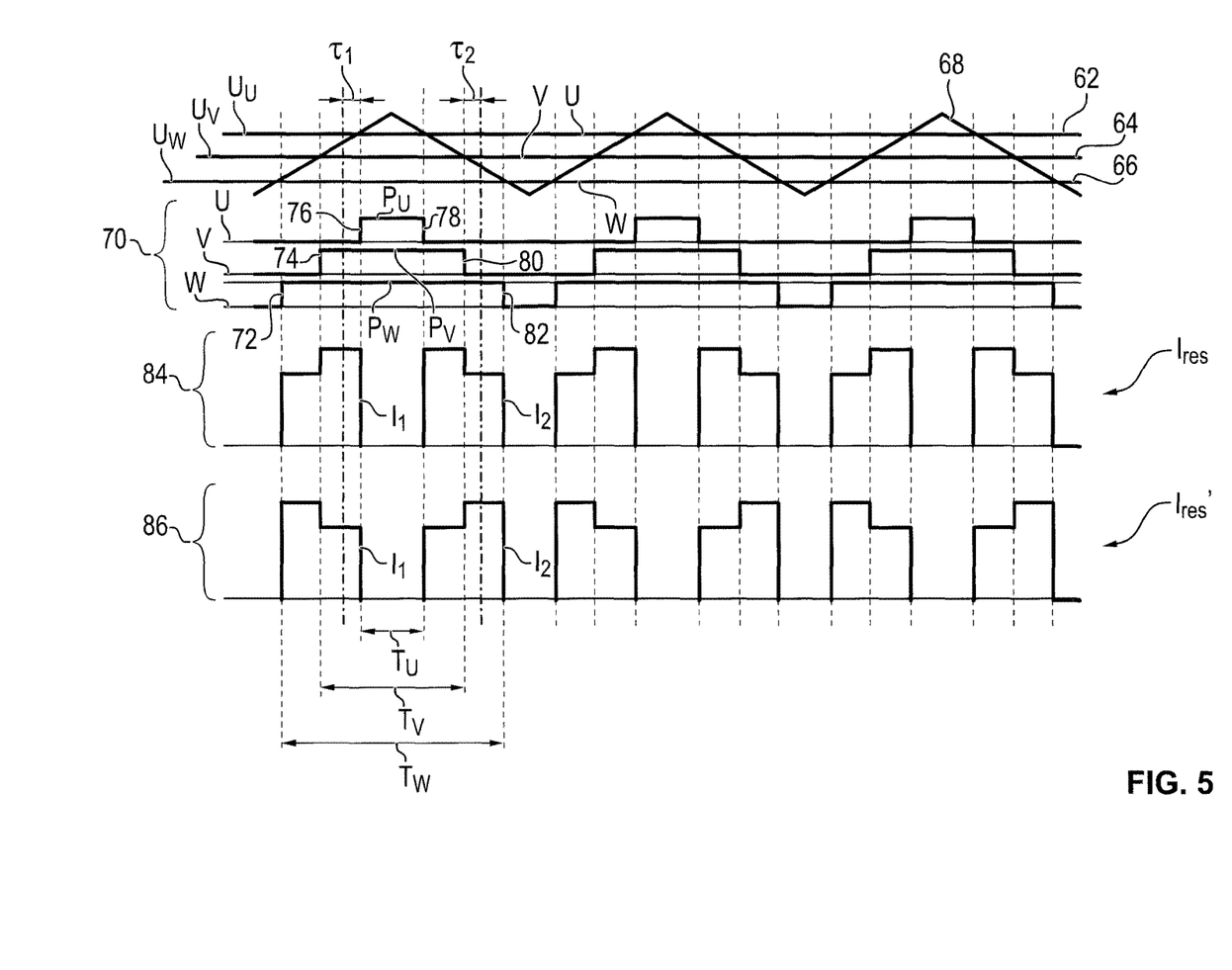
FIG. 5 is a diagram of a PWM control of the phase windings.

FIG. 5 subsequently shows and describes the waveform on the individual phase terminals 22, 24, 26, and how the voltage or PWM signals can advantageously be controlled or regulated at the individual phase windings U, V, W, as well as which consequences result therefrom with respect to the currents $I_U, I_V, I_W$ in the phase windings U, V, W and the input current $I_E$ of the external power source 8.

The diagram in FIG. 5 comprises four horizontal superimposed sections. The time is plotted horizontally, i.e., on the x-axis or abscissa axis. By way of example, three periods of the PWM control are shown in FIG. 5, a period here being a length of, for example, 50 μs (microseconds).

FIG. 5 shows a PWM control at which the phase terminals 22, 24, 26 of the electric motor 4 are each actuated with a PWM (pulse) signal $P_U, P_V, P_W$ of a different duty cycle. The current desired voltages $U_U, U_V, U_W$ of the three phases U, V and W are shown in FIG. 5 with an instantaneous value 62, 64 and 66 respectively shown as a horizontal line. In this case, the desired voltage values vary over the time as a function of the rotational speed of the electric motor 4 in each case in the manner of a sinusoidal function. This causes the lines of the instantaneous values 62, 64 and 66 to move up and down periodically in the vertical direction, i.e., along the Y-axis or ordinate axis.

The saw tooth-shaped line in the upper section of the diagram represents a periodically linearly increasing and linearly decreasing counter reading 68 of a counter integrated in the controller 42. The points of intersection between the thresholds of the individual phases U, V, W which are fixed for a specific point in time, that is to say, the instantaneous values 62, 64, 66 with the saw tooth-like counter reading 68, represent the point in time for generating and terminating the (PWM) pulses $P_U, P_V, P_W$, with which the phase windings U, V, W are applied. This means that in the case of a high voltage threshold, the instantaneous value 62, 64, 66 is low, so that the sample time of the pulse-shaped pulse $P_U$, $P_V$, $P_W$ is long, that is to say, that the respective phase U, V, W is supplied with the phase current $I_U$, $I_V$, $I_W$ or applied with a voltage for a prolonged time.

In the second section 70 of the diagram of FIG. 5, the voltage profiles at the phase terminals 22, 24 and 26 are shown in a time-resolved manner. In this exemplary embodiment, a voltage is initially applied to the phase W at a point in time 72. The phase winding V is then supplied with a voltage at a point in time 74. Thereafter, the power supply to the phase U begins at a point in time 76. After a first pulse duration $T_U$, the phase U is separated from the voltage signal at a point in time 78 and thus, the pulse $P_U$ is terminated. Subsequently, the pulse $P_V$ of the phase V is terminated after a pulse duration $T_V$ at a point in time 80, and the pulse $P_W$ of the phase W is terminated after a pulse duration $T_W$ at a point in time 82. This voltage profile is periodically repeated as a pulse sequence for the three phases U, V, W.

In the third section 84 and fourth section 86 of FIG. 5, a respective time profile of the alternating current $I_{res}$ resulting from the PWM control is shown in the power source 8, for example, in the intermediate circuit 12.

In section 84, the alternating current $I_{res}$ is shown for an operating situation in which the phase winding U is flowed through in terms of magnitude with a phase current $I_U$ of 4 A (amps), the phase winding V with a phase current $I_V$ of 1 A, and the phase winding W with a phase current $I_W$ of 3 A. With respect to the directions from and to the star point 28, the phase currents $I_V$ and $I_W$ have an inverted current direction relative to the phase current $I_U$. In other words, the phase currents $I_V$ and $I_W$ are directed opposite the phase current $I_U$.

Thus, in the period between the points in time 72 and 74, a current of 3 A flows through the phase winding W, wherein an additional current of 1 A is added from the point in time 74 through the phase winding V. Thereby, the resulting alternating current $I_{res}$ has a current level of 4 A in the period between points in time 74 and 76. At the point in time 76, a current is added by the pulse $P_U$, which has a current direction n opposite the other currents, at the same current amplitude. In this way, the resulting (total) alternating current $I_{res}$ is essentially completely reduced for the pulse duration $T_U$ between points in time 76 and 78.

In the duration between points in time 78 and 80, the phase current $I_U$ is switched off again by the phase U, so that the alternating current $I_{res}$ again has an amplitude of 4 A in this period of time. At the point in time 80, this amplitude is reduced back to 3 A, and at the point in time 82, after termination of the pulse $P_W$, it is essentially completely reduced.

As shown relatively clearly in FIG. 5, essentially two alternating-current components (current blocks) $I_1$ and $I_2$ are formed by the pulse sequence that repeat periodically during the PWM control. The alternating current component $I_1$ starts at the point in time 72 and terminates at the point in time 76, wherein the alternating current component $I_2$ begins at the point in time 78 and terminates at the point in time 82.

Overall, this results in a high number of switching operations per period of the pulses $P_U$, $P_V$, $P_W$ and, due to the widely varying currents in the intermediate circuit 12, a high alternating current $I_{res}$, which periodically charges and discharges the DC link capacitor 14.

Section 86 of FIG. 5 shows a situation in which the current directions of the phase currents $I_V$ and $I_W$ are opposite each other and the direction of current in phase U has the same orientation as in the phase V. Also in this case, a high number of (changeover) switching operations result with similar high alternating-current components $I_1$ and $I_2$.

Depending on the course of the phase currents $I_U$, $I_V$, $I_W$, thus a different alternating current $I_{res}$ arises. The alternating current $I_{res}$ has a frequency distribution of which the main components in particular are at a multiple n of the PWM (clock) frequency.

Hereinafter, a method for reducing the alternating current $I_{res}$ in the intermediate circuit 12 is described with reference to FIGS. 6a and 6b. For this purpose, the controller 42 uses a modulation method for the PWM control in which the frequency spectrum of the alternating current $I_{res}$ is influenced such that the alternating current component is minimized at a frequency, in particular, in a major proportion.

To this end, the controller determines 42 in each case, for example by means of Fourier transform, a frequency spectrum $F_1(\omega)$, $F_2(\omega)$ for the alternating current component $I_1$ or $I_2$, wherein $\omega$ is the angular frequency.

The frequency spectra of $F_1(\omega)$ and $F_2(\omega)$ generally have comparable amplitudes, but differ in their respective phase position. The corresponding frequency spectrum $F_{res}(\omega)$ of the resulting alternating current $I_{res}$ arises due to the linearity of the Fourier transform as the sum of the individual frequency spectra $F_1(\omega)$ and $F_2(\omega)$ as $$F_{res}(\omega)=F_1(\omega)+F_2(\omega).$$

The amplitude of the frequency spectrum $F_1(\omega)$ is minimized for a given frequency $\omega_0$ when the individual frequency spectra $F_1(\omega)$ and $F_2(\omega)$ are shifted at the frequency $\omega_0$ the phase position is opposite, that is by 180°. Mathematically, a change in the phase position according to the displacement law results by multiplying by a complex phase factor according to the relationship $$F'_1(\omega)=e^{-j\omega\tau_1}F_1(\omega),$$

where j is the imaginary unit and $\tau_1$ is a first duration or displacement time.

This means that, for a shift by the duration $\tau_1$, only the phase position but not the amplitude of the frequency spectrum $F_1(\omega)$ is changed. By the displacement of both frequency spectra $F_1(\omega)$ and $F_2(\omega)$, it follows that:

$$F'_{res}(\omega)=e^{-j\omega\tau_1}F_1(\omega)+e^{-j\omega\tau_2}F_2(\omega),$$

wherein $\tau_2$ describes a duration or time shift for the frequency spectrum $F_2(\omega)$ of the alternating current component $I_2$.

By a suitable selection of durations $\tau_1$ and $\tau_2$, it is possible that for the frequency $\omega_0$, the frequency spectrum $F'_{res}(\omega)$ is minimal. In this case, the frequency $\omega_0$ is in particular the clock frequency of the PWM control, which means, the basic or repetition frequency of the alternating current components $I_1$ and $I_2$.

Figure 6A:
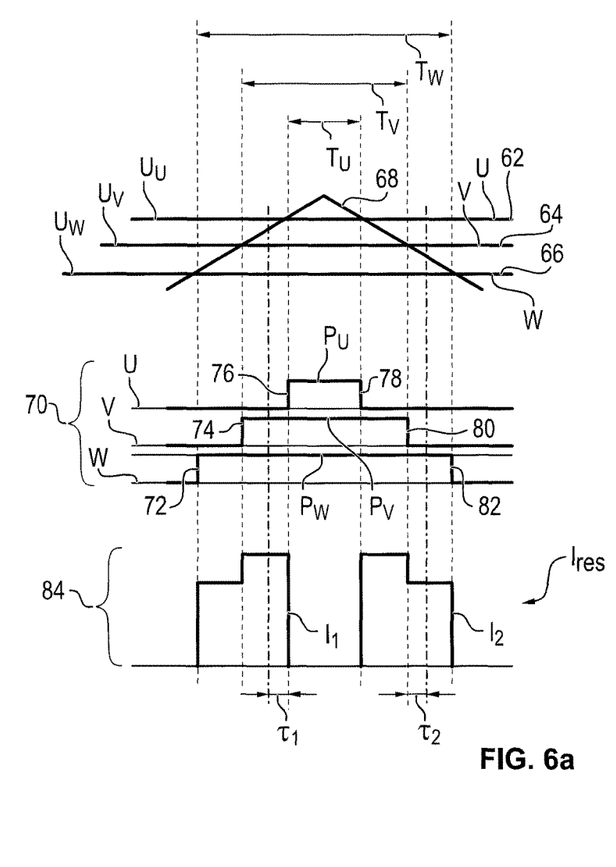
FIGS. 6a and 6b illustrates diagrams of the PWM control in a phase shift.
Figure 6B:
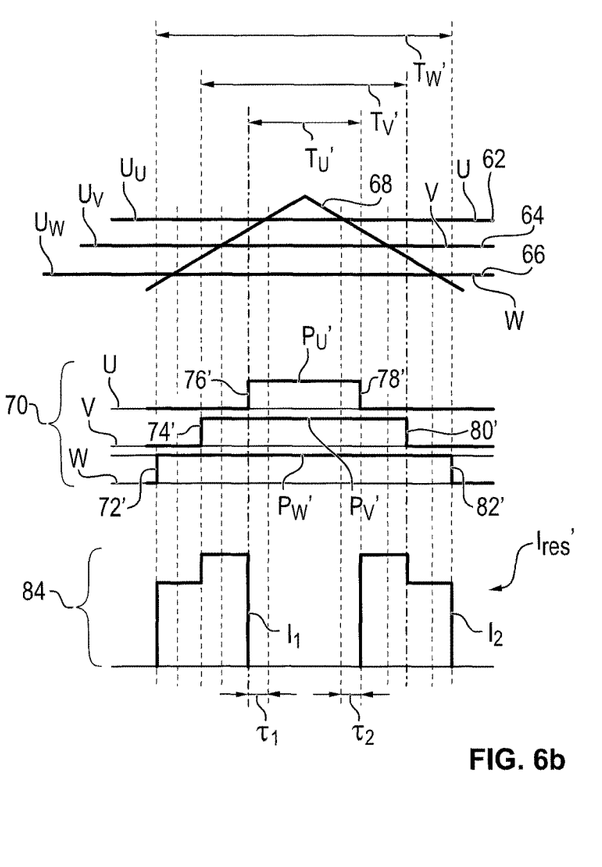

As indicated schematically in FIGS. 6a and 6b, this phase shift is realized in that the alternating current components $I_1$ and $I_2$ are shifted in time against each other. For this purpose, all the phases U, V, W are, on the one hand, switched on earlier during the PWM control by a duration $-\tau_1$. This means that the pulses $P'_U$, $P'_V$, $P'_W$ are produced at a point in time 72', 74', 76' which has been frontloaded by a duration $-\tau_1$. On the other hand, the phases U, V, W are switched off at a point in 78', 80', 82', delayed by the duration $\tau_2$. In other words, the pulses $P'_U$, $P'_V$, $P'_W$ terminate a duration $\tau_2$ later. This effectively extends the pulse durations $T'_U$, $T'_V$, $T'_W$ of the $P'_U$, $P'_V$, $P'_W$ by a duration $\tau_1+\tau_2$. This means that the duty cycle of the PWM control is adjusted during the phase shift.

In the embodiment in FIG. 6b, the durations $\tau_1$, $\tau_2$ are equal in magnitude, which means in particular that the duration $-_{T1}$ is equal to the duration $_{T2}$. This ensures that the average value of the resulting alternating current I'$_{res}$ is not substantially changed.

In a suitable embodiment, the durations $_{T1}$ and $_{T2}$ are determined in advance for different frequencies $\omega_0$ and are stored in a table of the controller 42. Additionally or alternatively, the alternating current components I$_1$ and I$_2$ are detected during operation via the shunt resistor 60, and the durations $_{T1}$ and $_{T2}$ are calculated in real time.

The invention is not limited to the embodiment described above. Rather, other variants of the invention can also be derived from those skilled in the art without departing from the scope of the invention. In particular, all the individual features described in connection with the exemplary embodiment can also be combined with one another in another manner without departing from the subject matter of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating an electric machine with a power source, an electric motor, and an intermediary power converter, the method comprising:

converting an input current of the power source into a multi-phase output current for the electric motor via a pulse width modulated control of a number of semiconductor switches of the converter, wherein each pulse is generated at a first point in time and terminated after a pulse duration at a second point in time;

determining a frequency sprectrum for each alternating current component generated in a course of the pulse-width-modulated driving of the semiconductor switches in an intermediate circuit of the power source; and setting the pulse durations of the pulses of the pulse width modulated control so as to minimize a sum of the frequency spectra of the alternating current components, wherein in order to minimize the sum of the frequency spectra, the frequency spectra are phase-shifted by 180° to each other and each pulse is generated a first duration earlier than the first point in time and terminated a second duration later than the second point in time.

2. The method according to claim 1, wherein the pulse durations are set for a particular frequency or a frequency of a maximum of each frequency spectrum.

3. The method according to claim 1, wherein each pulse for the generation of the multi-phase output current is provided with the same first and second duration for setting the pulse duration.

4. The method according to claim 1, wherein the first and second duration are equal in magnitude.

5. The method according to claim 1, wherein the first and second duration of different specific frequencies are calculated and stored in a table.

6. An electric machine for a motor vehicle with a power source and with an electric motor and with an intermediary power converter with a controller for carrying out the method according to claim 1.

* * * * *